(No Model.) 4 Sheets—Sheet 1.
C. CHRISTIAN.
CORN HARVESTER.

No. 460,197. Patented Sept. 29, 1891.

Witnesses
Geo. J. Thorpe.
Jno. L. Condon.

Inventor
Charles Christian
By his Attorneys
Higdon & Higdon.

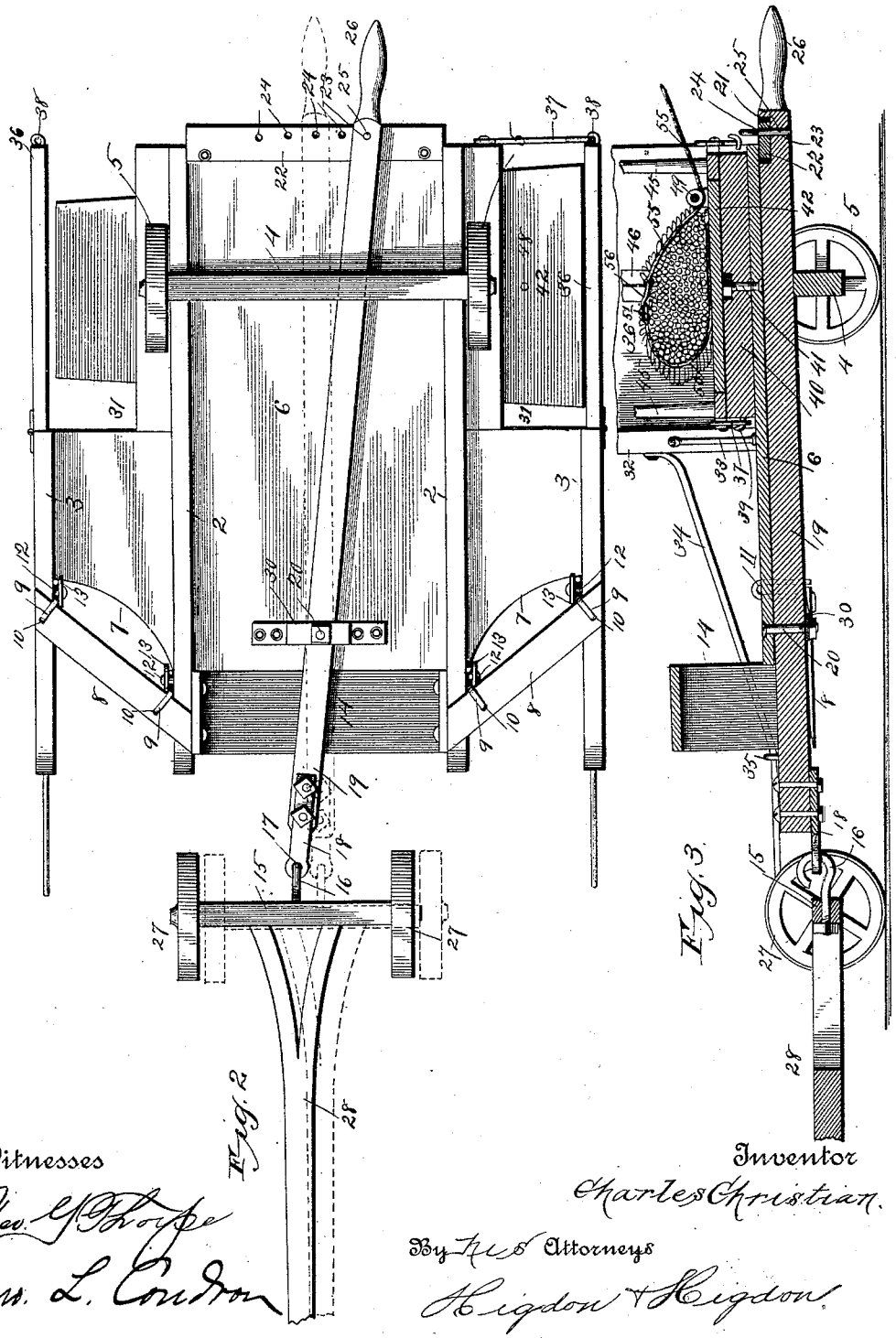

(No Model.)  C. CHRISTIAN.  4 Sheets—Sheet 3.
CORN HARVESTER.

No. 460,197.  Patented Sept. 29, 1891.

Witnesses  Inventor
Geo. Y. Loose  Charles Christian
Jno. L. Condron  By his Attorneys
  Higdon & Higdon (No Model.) 4 Sheets—Sheet 4.
C. CHRISTIAN.
CORN HARVESTER.

No. 460,197. Patented Sept. 29, 1891.

Witnesses
Geo. M. Plote
Jno. L. Condon

Inventor
Charles Christian
By his Attorneys
Higdon & Higdon

UNITED STATES PATENT OFFICE.

CHARLES CHRISTIAN, OF CLINTON, KANSAS, ASSIGNOR OF TWO-THIRDS TO JAMES R. WOODWARD AND CHARLES E. WOODWARD, OF SAME PLACE.

CORN-HARVESTER.

SPECIFICATION forming part of Letters Patent No. 460,197, dated September 29, 1891.

Application filed February 12, 1891. Serial No. 381,230. (No model.)

*To all whom it may concern:*

Be it known that I, CHARLES CHRISTIAN, of Clinton, Douglas county, Kansas, have invented certain new and useful Improvements in Corn-Harvesters, of which the following is a full, clear, and exact description, reference being had to the accompanying drawings, forming a part hereof.

My invention relates to machines for harvesting cornstalks; and the objects of my invention are to procure a machine which shall rapidly and effectively cut the stalks in the field, form the same into shocks, bind the same, spread the basis of the shocks so as to permit the same to be placed and remain on end, and readily drop or discharge the shocks by a practically continuous operation; furthermore, to produce a machine the progress of which can be readily varied to accord with variations in the rows from straight lines, and thereby insure the gathering of all the stalks in the field.

To the above purpose my invention consists in certain peculiar and novel features of construction and arrangement, as hereinafter described, and pointed out in the appended claims.

In order that my invention may be fully understood, I will proceed to describe it with reference to the accompanying drawings, in which—

Figure 1:
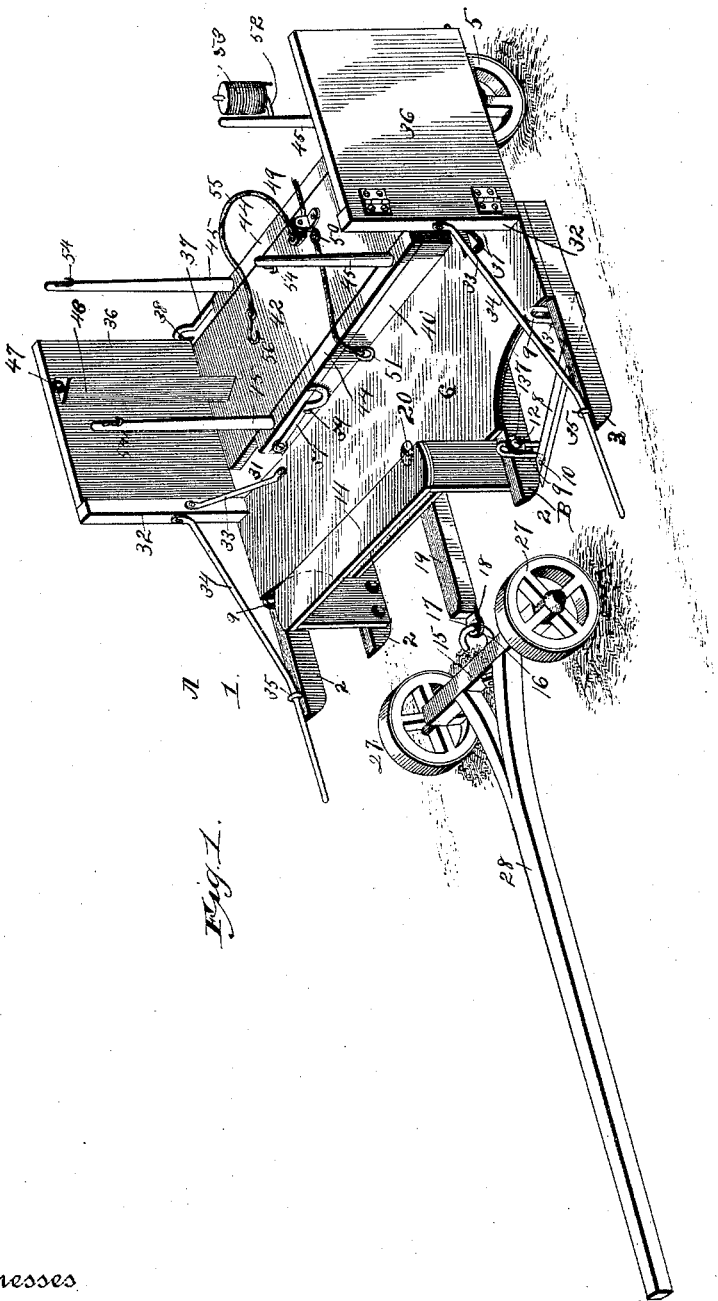
Figure 4:
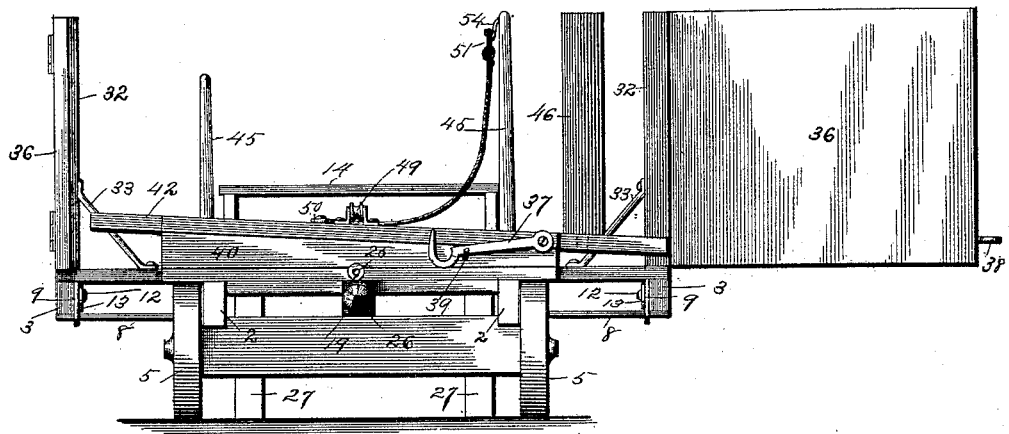
Figure 5:
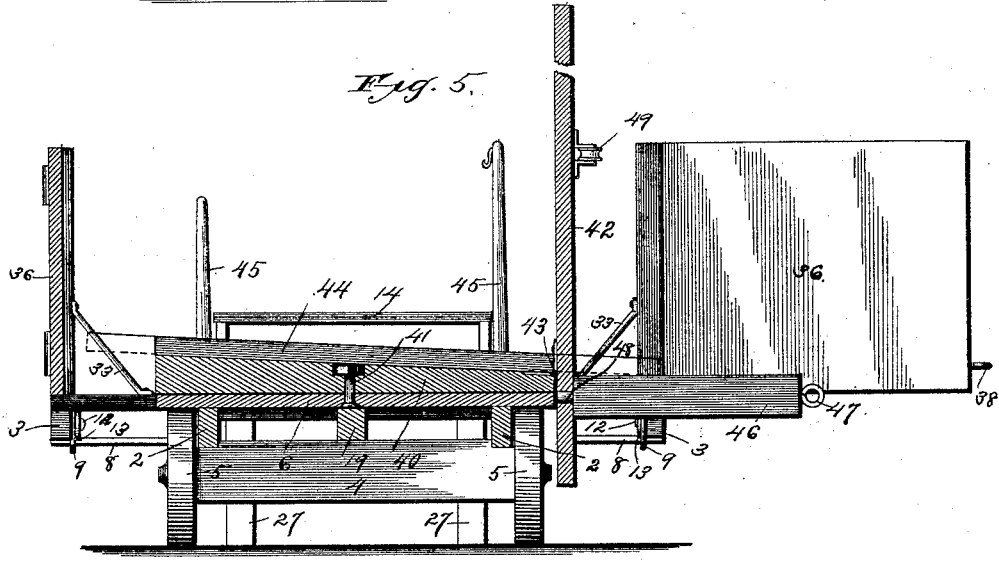
Figure 6:
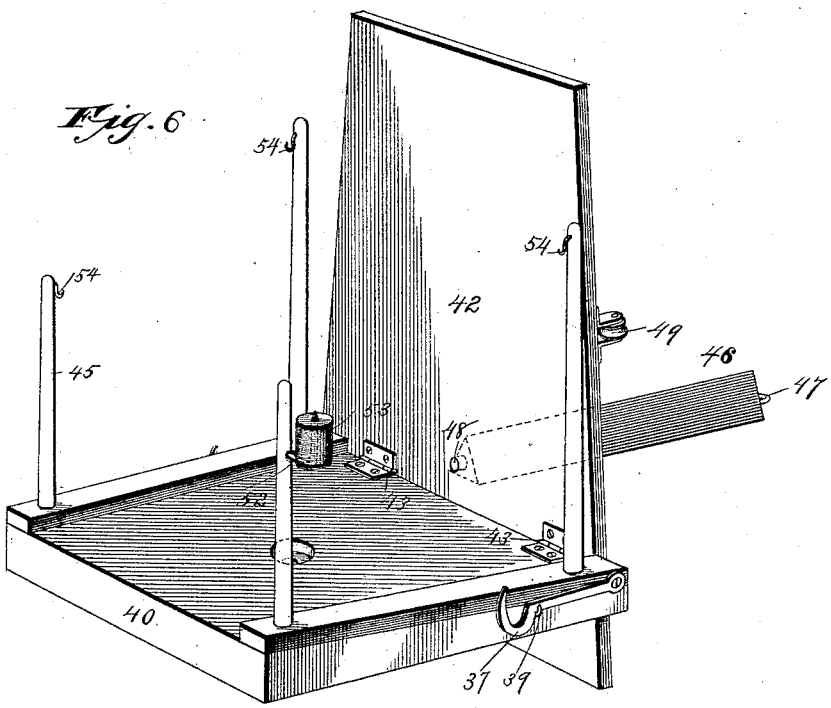
Figure 7:
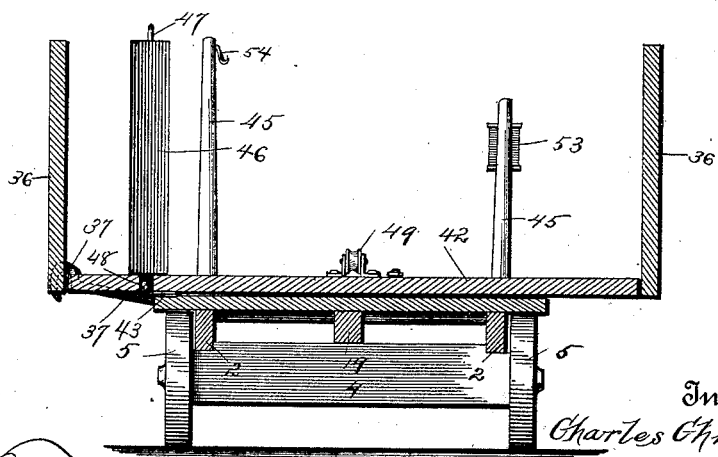

Figure 1 is a perspective view of a cornstalk-harvester embodying my invention. Fig. 2 is an inverted plan view of the same. Fig. 3 is a central vertical longitudinal section of the same. Fig. 4 is a rear elevation of the same, with one of the side boards in position to permit the bundle or sheaf to be discharged. Fig. 5 is a transverse vertical section of the rear end of the machine, as shown in Fig. 4. Fig. 6 is a detached perspective view of the turn-table and one of the discharging-boards. Fig. 7 is a transverse vertical section of a machine provided with a modified form of dumping mechanism.

In said drawings, 1 designates the carrying-frame of the machine, which is of general oblong rectangular form, substantially as shown in the drawings, and which is preferably composed, principally, of a base-board 6, extending sidewise of the vehicle. This base-board rests at its sides upon two side beams or sills 2 2, which in turn rest upon the rear carrying-axle 4 of the vehicle. The rear carrying-axle 4 is provided at its ends with carrying-wheels 5 of any suitable or preferable type, and the front or rear ends of said beam or sills 2 are braced together by cross-beams 14 and 22, respectively, the cross-beam 14 being raised above the level of the base-board 6, so as to form also a seat for the driver or a support for a suitable seat.

The front part of the vehicle is supported upon a carrying-axle 15, upon the ends of which are mounted two suitable carrying-wheels 27, from which axle extends a suitable draft-tongue 28. This axle 15 is so connected to the vehicle-body as to turn, and thus vary the direction of progress of the vehicle, and this connection is constructed as follows: A long lever 19 extends longitudinally beneath the base-board 6, and above the rear axle 4 and the rear end of said lever protruding beyond the rear end of the base-board, so as to form a handle 26. This lever is pivoted beneath the forward end of the base-board 6 by a bolt 20, which extends vertically through the lever and base-board and also through a retaining-strap 30, secured to the under side of the base-board and extending beneath the lever. The front end of the lever 19 carries a shank 18, having at its front end an eye 17, which receives a hook 16, the latter extending rearwardly from the front axle 15 midway of the length of the same, and constituting the fulcrum upon which said axle turns. The rear cross-beam 22 of the vehicle-body is formed with a number of openings 24, disposed longitudinally of the beam and serving to receive a pin 25, which passes downwardly through one of said holes and into a hole 23 in the rear end of the lever 19. The purpose or function of this lever 19 is to vary the direction or movement of the vehicle laterally so as to accord with the variations of the rows of cornstalks from straight lines, and thus insure the gathering of all of the stalks. The rear end of the lever 19 is shifted so as to bring its opening 23 beneath one or the other of the holes 24 in the cross-beam 22, as required, and the pin 25 is set to hold the lever in such position while the vertical body is caused to vary laterally in its travel, as previously described.

The sides of the base-board 6 extend outward beyond the side beams or sills 2, before referred to, and carry each a guard or deflector 3, which extends longitudinally of the machine and protrudes forward from the front corners of the base-board. Between each guard 3 and the adjacent side beam or sill 2 is interposed an adjustable cutter 8, to be hereinafter more particularly described, and the purpose of the guards or deflectors is to carry the stalks inward toward the cutters or knives 8, so as to insure the proper cutting of the stalks. In this operation the guards or deflectors are aided by metal extension-rods 34, which protrude from beyond the front ends of the guards 3, and which also extend obliquely upward and rearward from the upper sides thereof to a connection at their rear ends with the front sides of the two uprights 32, also to be hereinafter more particularly described.

In order to adapt the knives or cutters 8 to cut at different heights, the said cutters are mounted at their ends upon U-shaped hangers 9, the ends 10 of which are suitably secured to the ends of the knives or cutters, and which embrace set-bolts 12, having each a washer 13, which serves to retain the end of the cutter or knife in its required position of adjustment. It will be seen that the hangers 12 lie against the outer and inner side beams 2 and guards 3, respectively, and are arranged the one somewhat in advance of the other, so that the knives each extend forward and inward, and thus insure the most effective cutting action upon the stalks of corn.

The rear end of the vehicle-frame is occupied by a dump-board 42, which extends transversely of the vehicle, and which is of such length as to extend beyond the sides of the vehicle-body, as clearly shown in the drawings. It is to be particularly observed that this dump-board diminishes in width from one end to the other, the purpose of this peculiar form being to impart the required expanded form to the butt-end of the bundles, so as to insure the required stability to the shock when placed upright in the field. In Figs. 1 to 6, inclusive, this board is shown as being revoluble, for which purpose it is centered midway of the length upon a pivot-pin 41, which extends downward through the base-board 6 before referred to and also through a board 40, which is interposed between the dump board and the base-board.

At the front and rear sides of the dump-board 42 are placed two boards 40ᵃ, which extend transversely of the vehicle-body close to the dump-board, and at each end of which is attached a vertical standard 45. These standards serve to receive the cornstalks between them and to retain such stalks in proper position to form a shock previous to and during the binding operation, to be hereinafter described.

Each of the beams 40 carries at one end a hook 37, which when not in use rests on a suitable pin 39, projecting from the outer side of the beam. These hooks are placed at opposite ends of the beams, as shown, and when in use one of the hooks is turned over outwardly to engage an eye 38 upon the rear edge of the adjacent end board 36. These end boards serve to even the ends of the cornstalks while the shock is being formed and bound, and each of said boards is hinged at its forward edge to a standard 32, rising vertically from the sides of the base-board 6. By virtue of this arrangement it will be seen that the dump-board can be readily reversed, so as to discharge the shock at either side of the vehicle, as desired. This dumping or discharging of the shock is accomplished in the following manner: The dump-board is connected at its lower edge to the outer end of the board 40 by two or more hinges 43, and after the bundle or shock has been formed and bound the dump-board is raised and tilted outward bodily on its hinges, so as to discharge the bundle out from the side of the machine, this position being shown in Fig. 6.

In certain instances—as, for example, when the stalks are green—it is advisable to employ an attachment for spreading out the butt-ends of the shocks, so as to insure the stability of the same when set on end in the field. This attachment or spreader is shown at 46 in the drawings, and consists of a long beam, which is triangular in cross-section. The lower end 48 of this beam is reduced to enter a hole in the dump-board, so as to cause the beam to assume a perpendicular position relative to the dump-board. At its opposite or upper end the beam is provided with a ring or other suitable handle, so as to adapt the beam to be utilized for tipping or dumping the dump-board, as above described, the ring or handle 47 being grasped by the operator in order to tilt or dump the dump-board into the position shown in Fig. 6, and to pull the spreader-bar out of the socket in the dumping-board just as the latter has completed its tilting movement, and thus prevent the spreader-bar from interfering with the discharge of the shock.

The standards 32, to which the end-boards 36 are hinged, are preferably braced internally by oblique braces 33, which are attached at their lower ends to the inner ends of the base-board 6 and at their upper ends to the inner sides of the lower parts of the said standards 32. Thus the standards 32 and their connected parts are rendered firm and rigid against the working strains to which they are subjected.

Upon one of the standards 54 is mounted a standard 52, which is designed to receive a spool 53 of any suitable type for supplying wire, cord, or other suitable material for holding the stalks together in the form of a shock. Upon the rear side of the dump-board is secured a rope 50, the free end of which is provided with a ring or eye 51. Adjacent to the point of attachment of the rope 50 is a pulley or sheave 49, also attached to the upper side of the dump-board near the rear edge thereof, and beneath this pulley extends a second rope 55, one end of which carries a hook 56.

While the cornstalks are being cut and fed upon the dump-board the rope 50 is laid in the position shown in Fig 1, and the hook 56 of the rope 55 is engaged with a hook 54 on the rear standard 45 opposite to that one which carries the spool 53. The stalks are thus fed in between the ropes 50 and 55, and after a sufficient number of stalks have been received to form a shock the hook 56 is engaged with the eye 51 and the rope 55 is drawn backward so as to firmly compress the bundle. Previous to this operation the wire or cord from the spool 53 is preferably laid along forward upon the dump-board 42 beneath the bundle, and after the latter has been compressed by the ropes 50 and 55, as above described, the wire is passed outward around the bundle or shock and knotted and severed, the shock being then dumped from the machine, as before explained.

It is obvious that, if preferred, the shock may be dumped immediately after its compression by the ropes 50 55 and the wire or cord from the spool 53 applied after the shock has reached the ground. This latter operation will avoid any tendency to rupture the wire or cord in consequence of the jolting of the shock when striking the ground.

In Fig. 7 I have shown a modified form of dumping-board which can be used in lieu of the revoluble dumping-board above described. In this instance the under board is dispensed with and the dumping-board 42 is hinged near one end of the base-boards 6, as shown at 43, the board 42 being lifted bodily upon its hinges to dump the shock. By disengaging the hook 37 from the eye 38 the dumping-board may be reversed bodily, so as to discharge the shock from the opposite side of the machine from that shown in Fig. 7, the hook 37 being engaged with the opposite eye. In other respects the several operations are similar to those above described.

From the above description it will be seen that the machine is simple, compact, and durable in construction, and that its operation is rapid and practically continuous, and, furthermore, that the machine is adapted to rapidly gather all the cornstalks from the field, however irregularly they may have been planted.

Having thus fully described my invention, what I claim as new therein, and desire to secure by Letters Patent, is—

1. An improved cornstalk-harvester comprising a vehicle-frame, an arm pivoted beneath the front end of the frame and serving to vary the direction of progress of the vehicle laterally to accord with the irregularities in the rows of stalks, and a carrying-axle pivotally connected to the front end of said arm, substantially as set forth.

2. An improved cornstalk-harvester comprising a dumping-board of plain flat form and of diminishing width from one end to the other to conform the shock to its required shape, a number of standards located at opposite sides of the board or platform near the ends thereof, and a vertical spreader-bar of triangular form in cross-section removably connected to the larger end of the dumping-board, substantially as set forth.

In testimony whereof I affix my signature in presence of two witnesses.

CHARLES CHRISTIAN.

Witnesses:
  JNO. L. CONDON,
  GEO. Y. THORPE.